United States Patent
Tanaka

(10) Patent No.: US 12,087,095 B2
(45) Date of Patent: Sep. 10, 2024

(54) GESTURE RECOGNITION APPARATUS, HEAD-MOUNTED-TYPE DISPLAY APPARATUS, GESTURE RECOGNITION METHOD, AND NON-TRANSITORY COMPUTER READABLE MEDIUM FOR RECOGNIZING GESTURE USING CAPTURED IMAGE

(71) Applicant: CANON KABUSHIKI KAISHA, Tokyo (JP)

(72) Inventor: Yuki Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 18/185,428

(22) Filed: Mar. 17, 2023

(65) Prior Publication Data

US 2023/0306788 A1   Sep. 28, 2023

(30) Foreign Application Priority Data

Mar. 22, 2022   (JP) .................................. 2022-045113

(51) Int. Cl.
G06F 3/01 (2006.01)
G06V 10/26 (2022.01)
G06V 40/20 (2022.01)

(52) U.S. Cl.
CPC .............. *G06V 40/28* (2022.01); *G06F 3/017* (2013.01); *G06V 10/267* (2022.01)

(58) Field of Classification Search
CPC ....... G06F 3/017; G06V 10/267; G06V 40/28
See application file for complete search history.

(56) References Cited

U.S. PATENT DOCUMENTS

| | | | | |
|---|---|---|---|---|
| 2015/0177842 | A1* | 6/2015 | Rudenko | G06F 3/017 345/156 |
| 2015/0288883 | A1* | 10/2015 | Shigeta | H04N 23/61 345/642 |
| 2016/0232405 | A1* | 8/2016 | Iwayama | H04N 1/107 |
| 2019/0102043 | A1* | 4/2019 | Lee | G06F 3/03 |

(Continued)

FOREIGN PATENT DOCUMENTS

| | | |
|---|---|---|
| JP | 2015-172887 A | 10/2015 |
| JP | 2017-191576 A | 10/2017 |
| JP | 2019-071048 A | 5/2019 |

*Primary Examiner* — Sanghyuk Park
(74) *Attorney, Agent, or Firm* — Carter, DeLuca & Farrell LLP

(57) ABSTRACT

A gesture recognition apparatus according to the present invention includes at least one memory and at least one processor which function as: a first detection unit configured to detect from a captured image a first portion making a gesture; a second detection unit configured to detect from the captured image a second portion making the gesture in the first portion detected by the first detection unit; and a recognition unit configured to recognize the gesture on a basis of motion of the first portion detected by the first detection unit and motion of the second portion detected by the second detection unit, wherein in a case where a detection result satisfying a predetermined condition is not obtained by the second detection unit, the recognition unit recognizes the gesture using a detection result satisfying the predetermined condition obtained in a past by the second detection unit.

22 Claims, 4 Drawing Sheets

(56) References Cited

U.S. PATENT DOCUMENTS

| | | | |
|---|---|---|---|
| 2020/0104038 A1* | 4/2020 | Kamath | G06F 3/165 |
| 2021/0311621 A1* | 10/2021 | Soman | G06F 1/1694 |
| 2022/0318544 A1* | 10/2022 | Wu | G01S 7/415 |
| 2023/0305634 A1 | 9/2023 | Tanaka | |

* cited by examiner

FIG. 2
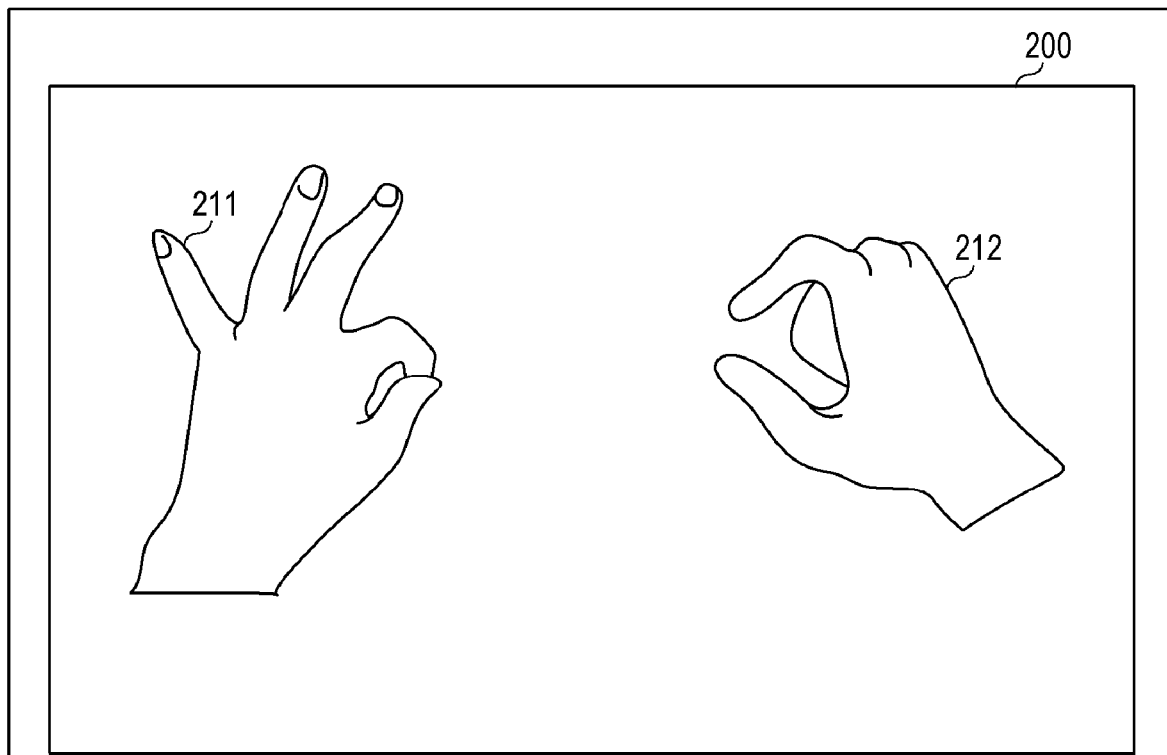
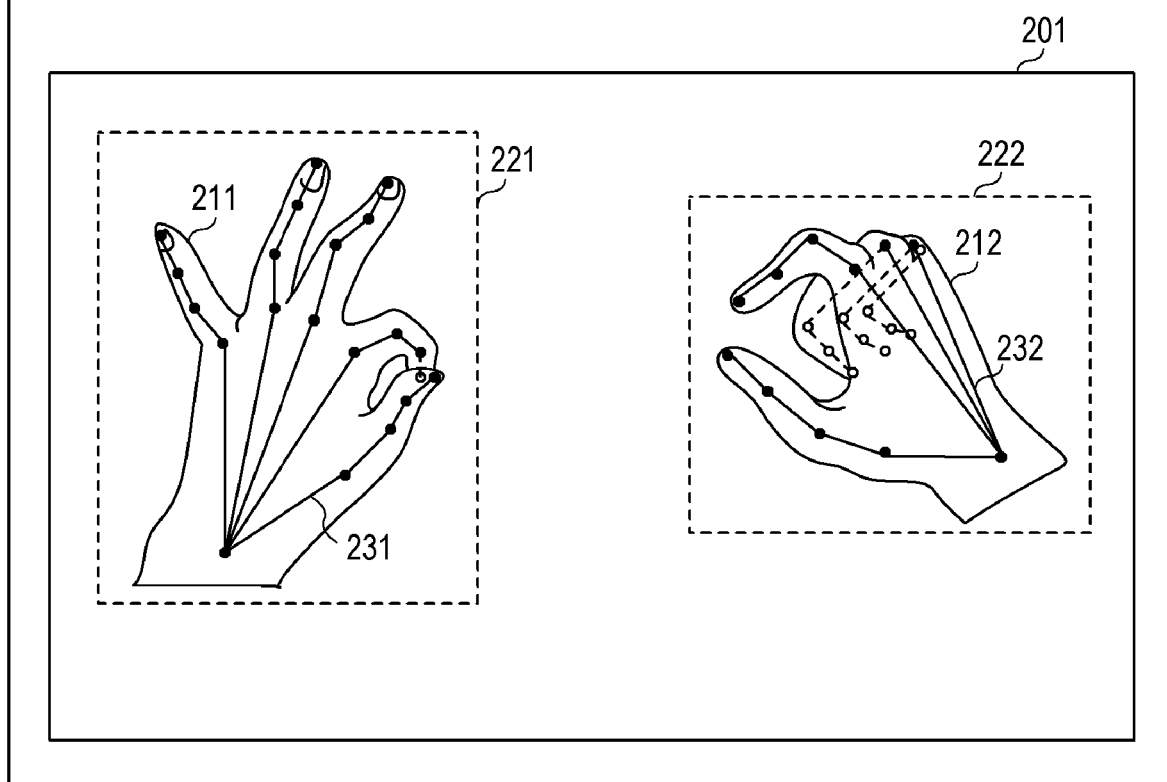

TIME t

GESTURE RECOGNITION APPARATUS, HEAD-MOUNTED-TYPE DISPLAY APPARATUS, GESTURE RECOGNITION METHOD, AND NON-TRANSITORY COMPUTER READABLE MEDIUM FOR RECOGNIZING GESTURE USING CAPTURED IMAGE

BACKGROUND OF THE INVENTION

Field of the Invention

The present invention relates to a technology for recognizing gestures.

Description of the Related Art

Technologies for recognizing gestures with the hands, fingers, or the like of users and perform processing according to the recognized gestures have been proposed. With such technologies, the users are enabled to operate an electronic apparatus (an input device of the electronic apparatus) without touching the same by making gestures.

It is disclosed in Japanese Patent Application Laid-open No. 2015-172887 that a hand serving as a portion to make a gesture is extracted from an image obtained by image-capturing the hand, fingers, or the like of a user with a camera, and that the shape of the extracted hand is specified to recognize the gesture.

It is disclosed in Japanese Patent Application Laid-open No. 2019-71048 that deep learning is used to recognize gestures.

However, when recognizing gestures with both hands or the like, there is a possibility that the gestures are not recognizable with high accuracy (recognition of the gestures becomes unstable), depending on situations. For example, when a right hand and a left hand are overlapped with each other, there is a possibility that the separation of the right and the left hand, the detection of joints or the like (key points to recognize gestures), the specification (recognition) of the shapes of hands (portions to make gestures), or the like is not performed with high accuracy (becomes unstable).

SUMMARY OF THE INVENTION

The present invention provides a technology capable of recognizing gestures with high accuracy under various situations.

The present invention in its first aspect provides a gesture recognition apparatus including at least one memory and at least one processor which function as: a first detection unit configured to detect from a captured image a first portion making a gesture; a second detection unit configured to detect from the captured image a second portion making the gesture in the first portion detected by the first detection unit; and a recognition unit configured to recognize the gesture on a basis of motion of the first portion detected by the first detection unit and motion of the second portion detected by the second detection unit, wherein in a case where a detection result satisfying a predetermined condition is not obtained by the second detection unit, the recognition unit recognizes the gesture using a detection result satisfying the predetermined condition obtained in a past by the second detection unit.

The present invention in its second aspect provides a head-mounted-type display apparatus including at least one memory and at least one processor which function as a display control unit configured to control display on a basis of a recognition result of the above described gesture recognition apparatus.

The present invention in its third aspect provides a gesture recognition method including: a first detection step of detecting from a captured image a first portion making a gesture; a second detection step of detecting from the captured image a second portion making the gesture in the first portion detected in the first detection step; and a recognition step of recognizing the gesture on a basis of motion of the first portion detected in the first detection step and motion of the second portion detected in the second detection step, wherein in a case where a detection result satisfying a predetermined condition is not obtained in the second detection step, in the recognition step, the gesture is recognized using a detection result satisfying the predetermined condition obtained in a past second detection step.

The present invention in its fourth aspect provides a non-transitory computer readable medium that stores a program, wherein the program causes a computer to execute a gesture recognition method including: a first detection step of detecting from a captured image a first portion making a gesture; a second detection step of detecting from the captured image a second portion making the gesture in the first portion detected in the first detection step; and a recognition step of recognizing the gesture on a basis of motion of the first portion detected in the first detection step and motion of the second portion detected in the second detection step, wherein in a case where a detection result satisfying a predetermined condition is not obtained in the second detection step, in the recognition step, the gesture is recognized using a detection result satisfying the predetermined condition obtained in a past second detection step.

Further features of the present invention will become apparent from the following description of exemplary embodiments with reference to the attached drawings.

BRIEF DESCRIPTION OF THE DRAWINGS

FIG. 2 is a diagram showing a detection example of hands and joints;

DESCRIPTION OF THE EMBODIMENTS

Figure 1:
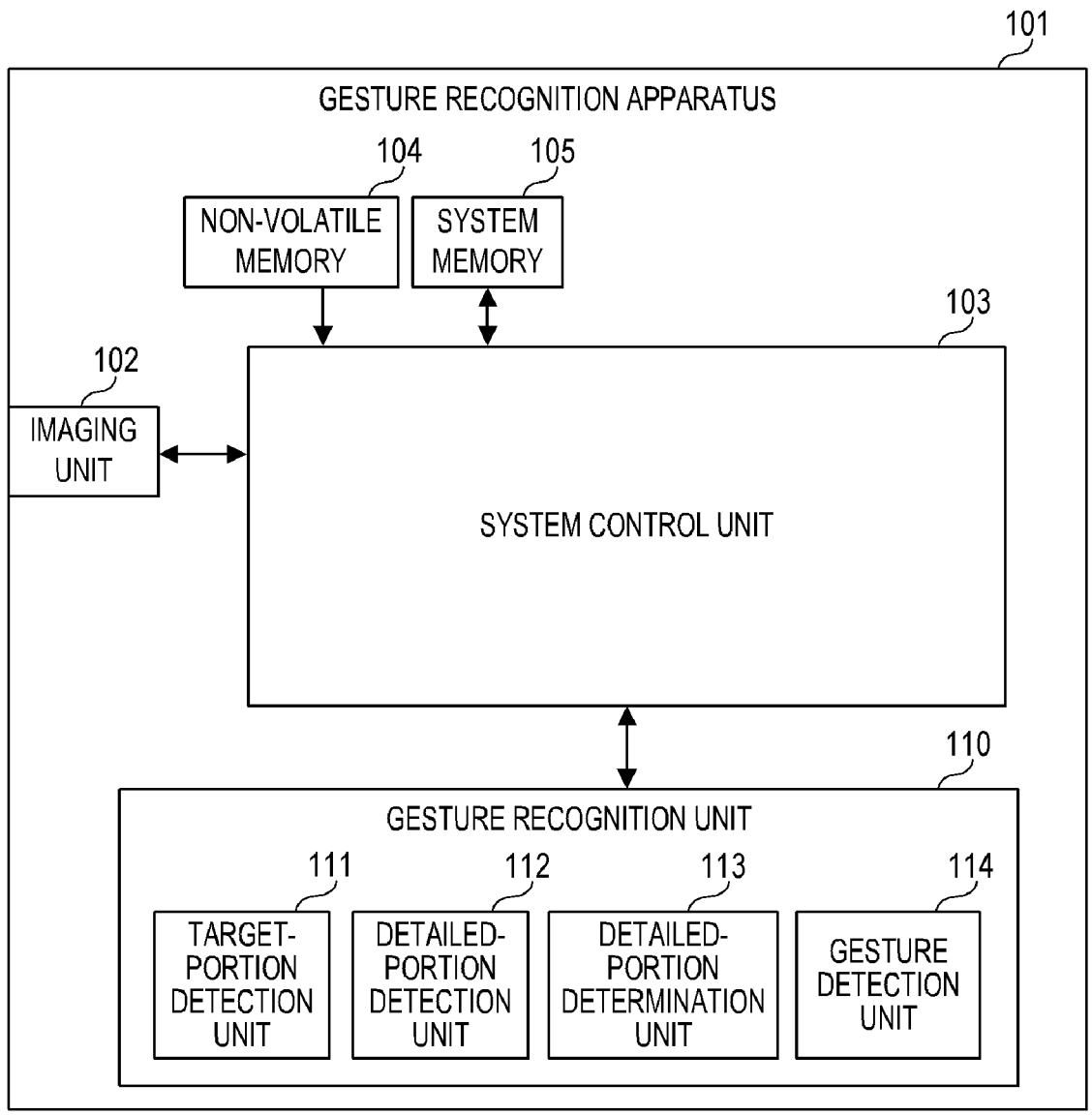
FIG. 1 is a block diagram showing a configuration example of a gesture recognition apparatus.

An embodiment of the present invention will be described. FIG. 1 is a block diagram showing a configuration example of a gesture recognition apparatus 101 in the present embodiment. The gesture recognition apparatus 101 has an imaging unit 102, a system control unit 103, a non-volatile memory 104, a system memory 105, and a gesture recognition unit 110.

The imaging unit 102 has an optical system including a plurality of lenses and an image sensor (for example, a CCD or CMOS sensor) and is arranged to face a direction in which an image of a gesture by a user is capable of being captured. An image sensor is used in the present embodiment, but any sensor available in the recognition of a gesture may only be used. A ranging sensor (for example, a sensor using a laser such as LiDAR (Light Detection and Ranging)) may be used as such.

The non-volatile memory 104 is electrically erasable/recordable memory and is, for example, a Flash-ROM or the like. In the non-volatile memory 104, the operating constant, program, or the like of the system control unit 103 is stored. Here, the program represents, for example, a program for performing the respective processing of a flowchart that will be described later in the present embodiment.

The system memory 105 is, for example, a RAM or the like and develops the operating variable of the system control unit 103, a constant or a program read from the non-volatile memory 104, or the like.

The system control unit 103 is a control unit composed of at least one processor or circuit and controls the entire gesture recognition apparatus 101. The system control unit 103 realizes the respective processing of the flowchart that will be described later by running the program stored in the non-volatile memory 104 described above. The system control unit 103 generates a detection image by applying image processing such as noise reduction and resizing to a captured image obtained from the imaging unit 102 and records the detection image on the system memory 105. Further, the system control unit 103 performs processing according to a gesture recognized by the gesture recognition unit 110. For example, the system control unit 103 generates a control signal corresponding to a recognized gesture and controls the respective units of the gesture recognition apparatus 101 using the control signal.

The gesture recognition unit 110 has a target-portion detection unit 111, an detailed-portion detection unit 112, a detailed-portion determination unit 113, and a gesture detection unit 114 and recognizes a gesture on the basis of a captured image (specifically a detection image described above) obtained from the imaging unit 102.

The gesture recognition unit 110 will be described in detail using FIG. 2. FIG. 2 is a diagram showing a detection example of hands and joints in the present embodiment.

An image 200 shown in FIG. 2 is a detection image obtained by applying image processing to a captured image obtained from the imaging unit 102. In the detection image 200, a left hand 211 and a right hand 212 of a user who makes a gesture (gesture operation) are reflected. An image 201 shown in FIG. 2 is an image obtained by superimposing the detection results of the target-portion detection unit 111 and the detailed-portion detection unit 112 on the detection image 200.

The target-portion detection unit 111 detects (extracts) hands that are target portions making a gesture from the detection image 200. In FIG. 2, a hand region (the region of a hand) is detected for each of the left hand 211 and the right hand 212. The hand region is, for example, a rectangle region surrounding a hand about the central position of the hand. A hand region 221 is detected for the left hand 211, and a hand region 222 is detected for the right hand 212.

The detailed-portion detection unit 112 detects (extracts), from the detection image 200, joints that are detailed portions to make a gesture in a target portion detected by the target-portion detection unit 111. In FIG. 2, the joint positions (the positions of the joints) of 21 spots from a wrist to respective fingertips are detected for each of the left hand 211 and the right hand 212. The target-portion detection unit 111 obtains joint information on the basis of the joint positions of the 21 spots. Joint information 231 is obtained for the left hand 211, and joint information 232 is obtained for the right hand 212. The joint information 231 and 232 shows the joint positions of the 21 spots and a plurality of line segments connecting the joint positions of the 21 spots together so as to form a skeletal frame. The joint positions shown by the joint information are, for example, relative positions with respect the hand regions. The joint positions shown by the joint information 231 are relative positions with respect to the hand region 221, and the joint positions shown by the joint information 232 are relative positions with respect to the hand region 222. Note that a user makes a gesture with hands or fingers in the present embodiment but may make a gesture with his/her body, arms, feet, face, eyes, mouth, or the like. The target portion may be a body, and the detailed portions may be arms, joints of arms, or the like. The target portion may be a face, and the detailed portions may be eyes or the like. Further, when a detection image (the number of pixels of a detection image) is large, it takes a long time to detect detailed portions. If a small detection image (a detection image having low resolution (pixel density)) is obtained by resizing, it takes a short time to detect detailed portions. However, the accuracy of the detection reduces. Therefore, the region (the hand region 221 or the hand region 222) of a target portion may be cut out from the detection image, and detailed portions may be detected from an image (cut-out image) of the cut-out region. The resolution of the cut-out image is the same as that of the detection image, but the cut-out image is smaller than the detection image (the number of pixels of the cut-out image is smaller than that of the detection image). Therefore, if detailed portions are detected from a cut-out image, it is possible to detect the detailed portions at a short time and with high accuracy.

The detailed-portion determination unit 113 determines (calculates) the reliability of a detection result (joint information) obtained by the detailed-portion detection unit 112. Then, the detailed-portion determination unit 113 determines joint information to be used in the gesture detection unit 114 according to whether the reliability is at least a threshold TH. Details (specific examples) about a method for determining the reliability, a method for determining the joint information to be used in the gesture detection unit 114, or the like will be described later.

The gesture detection unit 114 detects (recognizes) a gesture on the basis of the motion of a target portion (hand) detected by the target-portion detection unit 111 and the motion of detailed portions (joints) detected by the detailed-portion detection unit 112. In the present embodiment, the gesture detection unit 114 detects a gesture using the detection result (hand region) of the target-portion detection unit 111 and the determination result (joint information) of the detailed-portion determination unit 113. The gesture detection unit 114 detects a gesture by, for example, comparing the detection result (hand region) of the target-portion detection unit 111 and the determination result (joint information) of the detailed-portion determination unit 113 with a gesture model stored in advance in the non-volatile memory 104. Note that a method for detecting a gesture is not limited to this, and a gesture may be detected using a detector having been learned by deep learning or the like. In the case of using deep learning, it is possible to detect, from the time-series data of joint information, a gesture (such as a gesture to draw a circle with a finger) that is not detectable from the data of one frame by using RNN (Recurrent Neural Network). A gesture detectable by the gesture detection unit 114 is not limited to one, but the gesture detection unit 114 may detect a plurality of gestures.

Figure 3:
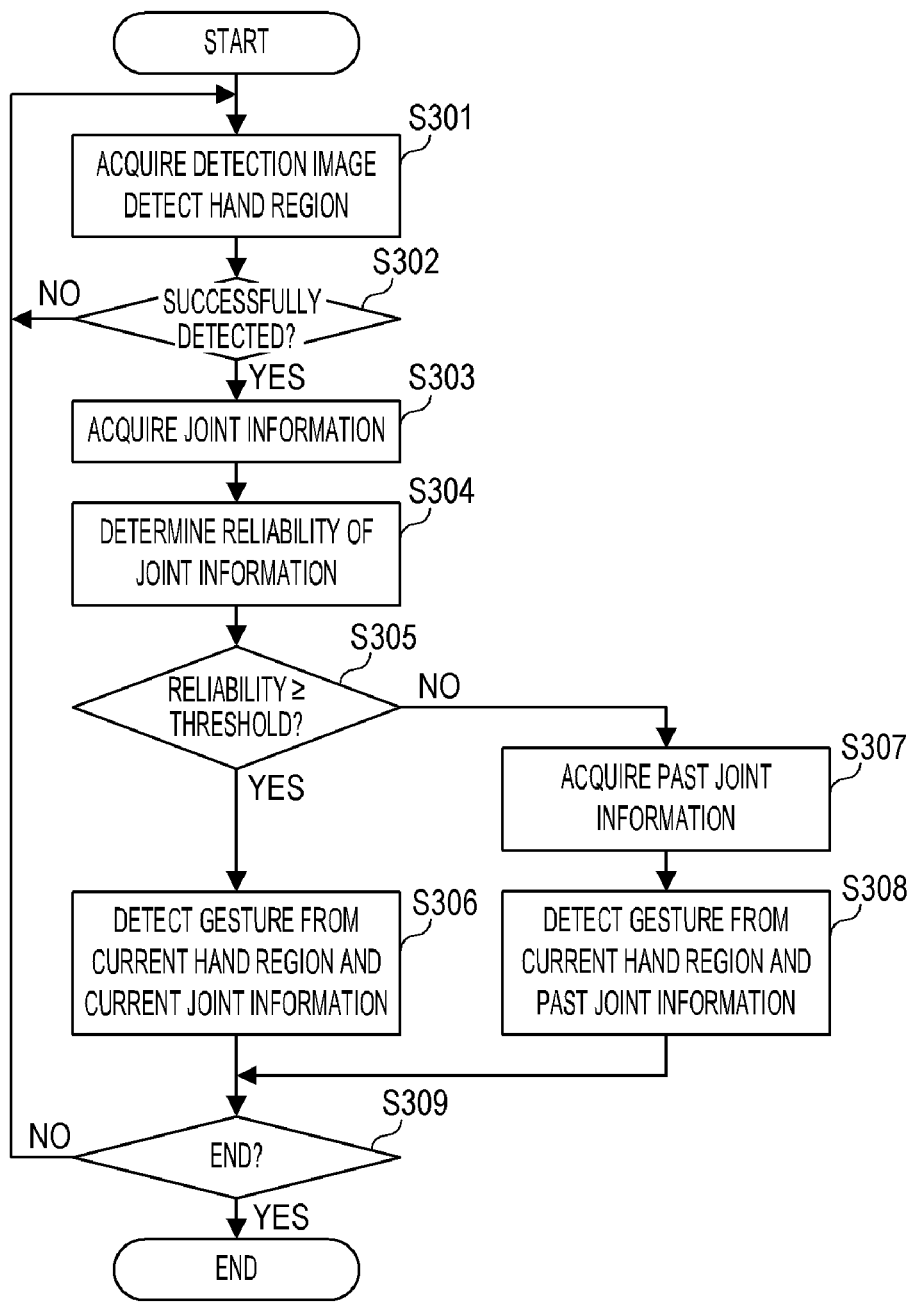
FIG. 3 is a flowchart showing an example of gesture recognition processing.
Figure 4:
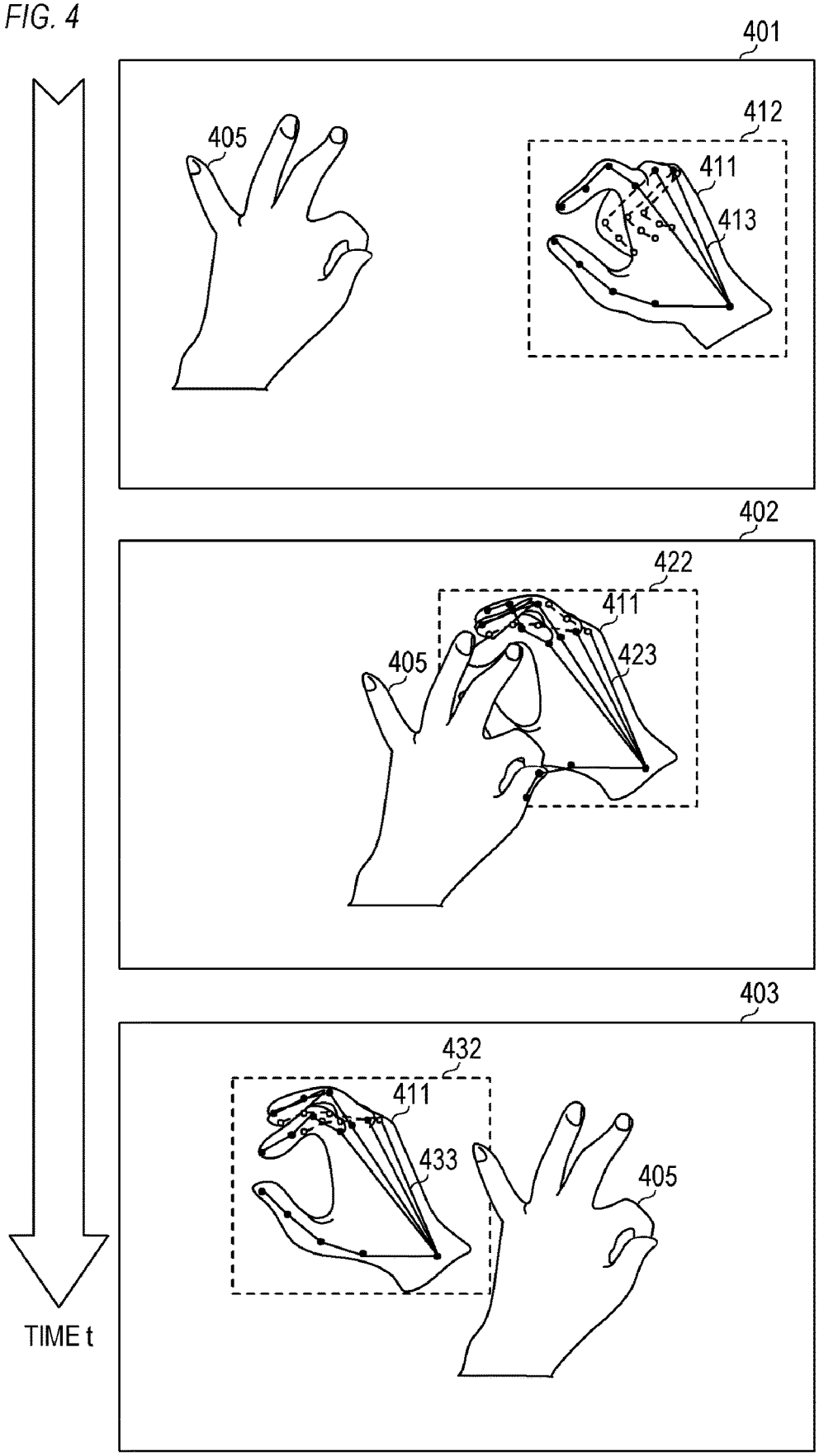
FIG. 4 is a diagram for describing an example of the gesture recognition processing.

Gesture recognition processing in the present embodiment will be described. FIG. 3 is a flowchart showing an example of the gesture recognition processing in the present embodiment. This processing is realized when the system control unit 103 develops a program stored in the non-volatile memory 104 into the system memory 105 and runs the same. For example, the processing of FIG. 3 starts when the gesture recognition apparatus 101 activates. FIG. 4 is a diagram for describing an example of the gesture recognition processing in the present embodiment. In FIG. 4, detection images 401 to 403 are arranged in chronological order. The detection image 401 is the oldest, and the detection image 403 is the newest. In the detection images 401 to 403, a left hand 405 and a right hand 411 are reflected. Hereinafter, processing relating to the right hand 411 will be described. However, in order to enable the recognition of gestures by a plurality of hands, processing relating to the right hand 411 and the processing relating to the left hand 405 may be performed in parallel or in sequence. The processing relating to the left hand 405 is the same as the processing relating to the right hand 411.

In step S301, the system control unit 103 acquires a captured image from the imaging unit 102 and applies image processing to the captured image to generate (acquire) the detection image 401. Then, the system control unit 103 detects a hand region 412 from the generated detection image 401 using the target-portion detection unit 111.

In step S302, the system control unit 103 determines whether the hand region 412 has been successfully detected in step S301. The processing proceeds to step S303 when the hand region 412 has been successfully detected. Otherwise, the processing returns to step S301. Here, it is assumed that the hand region 412 has been successfully detected and the processing proceeds to step S303.

In step S303, the system control unit 103 acquires, using the detailed-portion detection unit 112, joint information 413 from the hand region 412 detected in step S301.

In step S304, the system control unit 103 determines (calculates), using the detailed-portion determination unit 113, the reliability of the joint information 413 (the detection result of the detailed-portion detection unit 112) acquired in step S303. When it is determined on the basis of the time-series data of joint information that the movement amounts (movement speeds) of joints in a detection image are larger than a threshold TH1, for example, when it is determined that joints have moved at an unexpected level (speed), it is highly likely that false joint information has been acquired. Also, when it is determined that the intervals between a plurality of joints in a detection image are longer than a threshold TH2, for example, when it is determined that the intervals between joints are unexpected lengths, it is highly likely that false joint information has been acquired. Also, when the ratio of a part reflected in a detection image of a hand (for example, the ratio of the number of pixels of the right hand 411 to the number of pixels of the hand region 412) is smaller than a threshold TH3, for example, when most of a hand is hidden behind another hand or the like, it is highly likely that false joint information has been acquired. Therefore, the reliability of the joint information may be calculated to be low in these cases. Note that the detailed-portion detection unit 112 may output a score showing the reliability of a detection result together with the detection result like a detector having been learned by deep learning.

In step S305, the system control unit 103 determines, using the detailed-portion determination unit 113, whether the reliability determined (calculated) in step S304 is at least a threshold TH. When the reliability is at least the threshold TH, the system control unit 103 determines the joint information 413 acquired in step S303 as joint information to be used in the gesture detection unit 114 and stores the same in the system memory 105. Then, the processing proceeds to step S306. When the reliability is less than the threshold TH, the system control unit 103 determines joint information stored in the system memory 105, that is, joint information having reliability of at least the threshold TH obtained in the past by the detailed-portion detection unit 112 as joint information to be used in the gesture detection unit 114. Then, the processing proceeds to step S307. For example, when the movement amounts of joints in the detection image are larger than a threshold TH1, when the intervals between a plurality of joints in the detection image are longer than a threshold TH2, or when the ratio of a part reflected in the detection image of a hand is smaller than a threshold TH3, the reliability becomes lower than the threshold TH. Note that the condition that the reliability is at least the threshold TH is used, but another predetermined condition that is satisfied when joint information is detectable with high accuracy (accurately) and that is not satisfied if not may be used. By switching joint information to be used in the gesture detection unit 114 depending on whether a predetermined condition is satisfied, it is possible to prevent false joint information from being used by the gesture detection unit 114 and eventually prevent the false detection of a gesture. Here, it is assumed that the reliability is at least the threshold TH and the processing proceeds to step S306.

In step S306, the system control unit 103 detects (recognizes), using the gesture detection unit 114, a gesture from the hand region 412 detected in step S301 and the joint information 413 acquired in step S303.

In step S309, the system control unit 103 determines whether to end the gesture recognition processing. The system control unit 103 ends the gesture recognition processing, or the processing returns to step S301. Here, it is assumed that the processing returns to step S301. In step S301, the system control unit 103 acquires a new detection image 402 to detect a hand region 422. In step S302, the system control unit 103 determines whether the hand region 422 has been successfully detected. Here, it is assumed that the hand region 422 has been successfully detected and the processing proceeds to step S303. The system control unit 103 acquires joint information 423 in step S303 and determines (calculates) the reliability of the joint information 423 (the detection result of the detailed-portion detection unit 112) in step S304. Then, in step S305, the system control unit 103 determines whether the reliability of the joint information 423 is at least the threshold TH. Here, it is assumed that the reliability is less than the threshold TH and the processing proceeds to step S307.

In step S307, the system control unit 103 acquires past joint information (joint information having reliability of at least the threshold TH) from the system memory 105. Then, the processing proceeds to step S308. When the joint information is not stored in the system memory 105 (when the joint information having the reliability of at least the threshold TH was not obtained in the past), the processing returns to step S301 so as not to recognize a gesture. Here, it is assumed that the joint information 413 is stored in the system memory 105 and the system control unit 103 acquires the joint information 413 from the system memory 105 to make the processing proceed to step S308. Note that the system control unit 103 may acquire the newest joint information when a plurality of joint information are stored in the system memory 105. When it is highly likely that a gesture is not recognizable with high accuracy even if the joint information is stored in the system memory 105, the processing may return to step S301 so as not to recognize (detect) the gesture. For example, the processing may return to step S301 when only joint information before a timing earlier by a predetermined time relative to the present is stored (when joint information having reliability of at least the threshold TH has not been obtained after the timing earlier by the predetermined time). Also, the processing may return to step S301 when the movement amount of the right hand 411 (for example, the movement amount of the central position of the right hand 411) in the detection image is larger than a threshold TH4.

In step S308, the system control unit 103 detects (recognizes), using the gesture detection unit 114, a gesture from the hand region 422 detected in step S301 and the past joint information 413 acquired in step S307.

In step S309, the system control unit 103 determines whether to end the gesture recognition processing. The system control unit 103 ends the gesture recognition processing, or the processing returns to step S301. Here, it is assumed that the processing returns to step S301. In step S301, the system control unit 103 acquires a new detection image 403 to detect a hand region 432. In step S302, the system control unit 103 determines whether the hand region 432 has been successfully detected. Here, it is assumed that the hand region 432 has been successfully detected and the processing proceeds to step S303. The system control unit 103 acquires joint information 433 in step S303 and determines (calculates) the reliability of the joint information 433 (the detection result of the detailed-portion detection unit 112) in step S304.

As described above, gestures are recognized using a detection result satisfying a predetermined condition obtained by the detailed-portion detection unit 112 in the past when the detection result satisfying the predetermined condition is not obtained by the detailed-portion detection unit 112 according to the present embodiment. In this manner, it is possible to recognize gestures with high accuracy under various environments.

Note that the above embodiment is only an example and configurations obtained by appropriately deforming or modifying the above configurations within the range of the gist of the present invention are also included in the present invention. For example, the gesture recognition apparatus 101 may be provided in an electronic apparatus (head-mounted type display apparatus) such as smart glasses for AR (Augmented Reality). In this case, a display control unit provided in the head-mounted type display apparatus controls display on the basis of the recognition result of the gesture recognition apparatus 101. The gesture recognition apparatus 101 (the gesture recognition unit 110) may be electronic apparatus separate from the head-mounted type display apparatus and may be, for example, a computer (server) on a cloud.

According to the present invention, it is possible to recognize gestures with high accuracy under various environments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-045113, filed on Mar. 22, 2022, which is hereby incorporated by reference herein in its entirety.

What is claimed is:

1. A gesture recognition apparatus comprising
at least one memory and at least one processor which function as:
a first detection unit configured to detect from a captured image from a first portion;
a second detection unit configured to detect from the captured image from a second portion in the first portion detected by the first detection unit; and
a recognition unit configured to recognize a gesture on a basis of motion of the first portion detected by the first detection unit and motion of the second portion detected by the second detection unit, wherein
in a case where a second portion satisfying a predetermined condition is not detected from a captured image at a predetermined timing by the second detection unit, the recognition unit recognizes a gesture using a second portion satisfying the predetermined condition detected from a captured image at a timing before the predetermined timing by the second detection unit and a first portion detected from the captured image at the predetermined timing by the first detection unit.

2. The gesture recognition apparatus according to claim 1, wherein
in a case where a movement amount of a second portion in the captured image at the predetermined timing is larger than a threshold, the recognition unit uses the second portion satisfying the predetermined condition detected from the captured image at the timing before the predetermined timing by the second detection unit.

3. The gesture recognition apparatus according to claim 1, wherein
the second detection unit detects a plurality of second portions, and
in a case where intervals between a plurality of second portions in the captured image at the predetermined timing are longer than a threshold, the recognition unit uses a plurality of second portions satisfying the predetermined condition detected from the captured image at the timing before the predetermined timing by the second detection unit.

4. The gesture recognition apparatus according to claim 1, wherein
the first detection unit detects a plurality of first portions, and
in a case where a ratio of a part of one first portion, which is hidden by overlapping of another first portion, to the one first portion at the predetermined timing is larger than a threshold, the recognition unit uses, as a second portion in the one first portion, the second portion satisfying the predetermined condition detected from the captured image at the timing before the predetermined timing by the second detection unit.

5. The gesture recognition apparatus according to claim 1, wherein
the at least one memory and the at least one processor further function as a determination unit configured to determine reliability of a second portion detected by the second detection unit, and
in a case where reliability of a second portion at the predetermined timing is lower than a threshold, the recognition unit uses a second portion having reliability higher than the threshold detected from the captured image at the timing before the predetermined timing by the second detection unit.

6. The gesture recognition apparatus according to claim 1, wherein
the second detection unit cuts out from the captured image a region of the first portion detected by the first detection unit and detects the second portion from an image of the cut-out region.

7. The gesture recognition apparatus according to claim 1, wherein
the at least one memory and the at least one processor further function as a generation unit configured to generate a control signal corresponding to the gesture recognized by the recognition unit.

8. The gesture recognition apparatus according to claim 1, wherein
in a case where a second portion satisfying the predetermined condition is not detected from the captured image at the predetermined timing by the second detection unit, the recognition unit uses a newest second portion satisfying the predetermined condition detected from the captured image at the timing before the predetermined timing by the second detection unit.

9. The gesture recognition apparatus according to claim 1, wherein
in a case where a second portion satisfying the predetermined condition is not detected from the captured image at the predetermined timing by the second detection unit, if a second portion satisfying the predetermined condition is not detected before the predetermined timing by the second detection unit, the recognition unit does not recognize a gesture.

10. The gesture recognition apparatus according to claim 1, wherein
in a case where a second portion satisfying the predetermined condition is not detected from the captured image at the predetermined timing by the second detection unit, if a second portion satisfying the predetermined condition is not detected during a predetermined period up to the predetermined timing by the second detection unit, the recognition unit does not recognize a gesture.

11. The gesture recognition apparatus according to claim 1, wherein
in a case where a second portion satisfying the predetermined condition is not detected from the captured image at the predetermined timing by the second detection unit, if a movement amount of the first portion in the captured image at the predetermined timing is larger than a threshold, the recognition unit does not recognize a gesture.

12. The gesture recognition apparatus according to claim 1, wherein
the first portion is a hand, and the second portion is a joint.

13. A head-mounted-type display apparatus comprising
at least one memory and at least one processor which function as a display control unit configured to control display on a basis of a recognition result of the gesture recognition apparatus according to claim 1.

14. The gesture recognition apparatus according to claim 1, wherein
the at least one memory and the at least one processor further function as a recording unit configured to record, on a storage, a detection result of a second portion detected by the second detection unit, and
the recognition unit obtains, from the storage, a detection result of the second portion satisfying the predetermined condition detected from the captured image at the timing before the predetermined timing.

15. The gesture recognition apparatus according to claim 1, wherein
in a case where a first portion is not detected by the first detection unit, the recognition unit does not recognize a gesture.

16. The gesture recognition apparatus according to claim 1, wherein
in a case where a second portion satisfying the predetermined condition is not detected from the captured image at the predetermined timing by the second detection unit, the recognition unit uses, as a second portion in the first portion detected from the captured image at the predetermined timing, the second portion satisfying the predetermined condition detected from the captured image at the timing before the predetermined timing by the second detection unit.

17. The gesture recognition apparatus according to claim 1, wherein
the first detection unit detects a rectangle region surrounding the first portion from the captured image, and
the second detection unit detects a spot corresponding to the second portion from the captured image.

18. The gesture recognition apparatus according to claim 1, wherein
the first portion includes a plurality of second portions.

19. The gesture recognition apparatus according to claim 1, wherein
the motion of the first portion is different from the motion of the second portion.

20. The gesture recognition apparatus according to claim 1, wherein
the recognition unit detects the motion of the first portion on a basis of first portions detected from a plurality of captured images, and detects the motion of the second portion on a basis of second portions detected from the plurality of captured images.

21. A gesture recognition method comprising:
a first detection step of detecting from a captured image from a first portion;

a second detection step of detecting from the captured image from a second portion in the first portion detected in the first detection step; and a recognition step of recognizing a gesture on a basis of motion of the first portion detected in the first detection step and motion of the second portion detected in the second detection step, wherein in a case where a second portion satisfying a predetermined condition is not detected from a captured image at a predetermined timing in the second detection step, in the recognition step, a gesture is recognized using a second portion satisfying the predetermined condition detected from a captured image at a timing before the predetermined timing in a past second detection step and a first portion detected from the captured image at the predetermined timing in the first detection step.

22. A non-transitory computer readable medium that stores a program, wherein the program causes a computer to execute a gesture recognition method comprising:

a first detection step of detecting from a captured image from a first portion;

a second detection step of detecting from the captured image from a second portion in the first portion detected in the first detection step; and a recognition step of recognizing a gesture on a basis of motion of the first portion detected in the first detection step and motion of the second portion detected in the second detection step, wherein in a case where a second portion satisfying a predetermined condition is not detected from a captured image at a predetermined timing in the second detection step, in the recognition step, a gesture is recognized using a second portion satisfying the predetermined condition detected from a captured image at a timing before the predetermined timing in a past second detection step and a first portion detected from the captured image at the predetermined timing in the first detection step.

* * * * *